(12) United States Patent
Schweizer et al.

(10) Patent No.: US 12,381,398 B2
(45) Date of Patent: Aug. 5, 2025

(54) GRID FORMING VECTOR CURRENT CONTROL

(71) Applicants: ABB Schweiz AG, Baden (CH); Hitachi Energy Ltd, Zürich (CH)

(72) Inventors: Mario Schweizer, Rütihof (CH); Stefan Almer, Zürich (CH); Lennart Harnefors, Västerås (SE)

(73) Assignees: ABB Schweiz AG, Baden (CH); Hitachi Energy Ltd, Zürich (CH)

( * ) Notice: Subject to any disclaimer, the term of this patent is extended or adjusted under 35 U.S.C. 154(b) by 342 days.

(21) Appl. No.: 17/781,665

(22) PCT Filed: Nov. 26, 2020

(86) PCT No.: PCT/EP2020/083499
§ 371 (c)(1),
(2) Date: Jun. 1, 2022

(87) PCT Pub. No.: WO2021/110532
PCT Pub. Date: Jun. 10, 2021

(65) Prior Publication Data
US 2023/0010298 A1    Jan. 12, 2023

(30) Foreign Application Priority Data
Dec. 2, 2019  (EP) .................................. 19212967

(51) Int. Cl.
*G05B 19/042* (2006.01)
*H02J 3/24* (2006.01)
(Continued)

(52) U.S. Cl.
CPC .............. *H02J 3/38* (2013.01); *G05B 19/042* (2013.01); *H02J 3/24* (2013.01);
(Continued)

(58) Field of Classification Search
CPC ... H02P 21/0003; G05B 15/02; G05B 19/042; F05B 2270/337
See application file for complete search history.

(56) References Cited

U.S. PATENT DOCUMENTS

| 10,536,003 B1 * | 1/2020 | Fan ......................... H02P 21/22 |
| 2014/0049233 A1 | 2/2014 | Cortes et al. |

(Continued)

FOREIGN PATENT DOCUMENTS

| CN | 106559005 A | 4/2017 |
| CN | 107591834 A | 1/2018 |

(Continued)

OTHER PUBLICATIONS

Zhang et al. (Grid-connected converters with virtual electromechanical characteristics: experimental verification, IEEE 2017 (Year: 2017).*

(Continued)

*Primary Examiner* — Darrin D Dunn
(74) *Attorney, Agent, or Firm* — Procopio, Cory, Hargreaves & Savitvh LLP

(57) ABSTRACT

The present disclosure provides a grid forming vector current control system configured to emulate a virtual synchronous machine (VSM). The disclosed system comprises a droop control unit, a current control unit, a virtual admittance unit and a phase locked loop (PLL) unit. The virtual admittance unit and the PLL unit are configured to emulate an inertia of the VSM. A virtual current source is connected in parallel to the VSM.

18 Claims, 13 Drawing Sheets

(51) Int. Cl.
   *H02J 3/38* (2006.01)
   *H02J 9/06* (2006.01)
(52) U.S. Cl.
   CPC ......... *G05B 2219/2639* (2013.01); *H02J 9/06* (2013.01); *H02J 2300/24* (2020.01)

(56) References Cited

U.S. PATENT DOCUMENTS

| | | |
|---|---|---|
| 2016/0006338 A1 | 1/2016 | Sakimoto et al. |
| 2018/0145582 A1 | 5/2018 | Shuai et al. |
| 2018/0269819 A1 | 9/2018 | Tuckey et al. |
| 2019/0010946 A1 | 1/2019 | Torrey et al. |
| 2019/0109461 A1 | 4/2019 | Khajehoddin et al. |

FOREIGN PATENT DOCUMENTS

| | | |
|---|---|---|
| CN | 108493984 A | 9/2018 |
| CN | 108923460 A | 11/2018 |
| CN | 109256803 A | 1/2019 |
| CN | 110048455 A | 7/2019 |
| CN | 110048457 A | 7/2019 |
| CN | 110518626 A | 11/2019 |
| EP | 3376627 A1 | 9/2018 |
| JP | 2014168351 A | 9/2014 |
| JP | 2017208932 A | 11/2017 |
| JP | 2018186695 A | 11/2018 |
| WO | 2015/131958 A1 | 9/2015 |
| WO | 2017/036517 A1 | 3/2017 |

OTHER PUBLICATIONS

Rouzbehi et al. (Multi-terminal HVDC grids with inertia mimicry capability, 2015 (Year: 2015).*
Ganesh et al. Hardware-in-loop Implementation of an Adaptive Droop Control Strategy for Effective Load Sharing in DC Microgrid) (Year: 2016).*
Virtual inertia: Current trends and future directions U Tamrakar, D Shrestha, M Maharjan, BP Bhattarai, TM Hansen, R Tonkoski (Year: 2017).*
Control of VSC-HVDC with electromechanical characteristics and unified primary strategy W Zhang, K Rouzbehi, JI Candela, A Luna, P Rodriguez 2016 IEEE Energy Conversion Congress and Exposition (ECCE), 2016•ieeexplore.ieee.org (Year: 2016).*
Mo et al. (Evaluation of Virtual Synchronous Machines With Dynamic or Quasi-Stationary Machine Models, 2017) (Year: 2017).*
Wei, Yalong et al., "Pre-synchronization Method of Virtual Synchronous Generator Using Virtual Power", Automation of Electric Power Systems, vol. 40, No. 12, Jun. 25, 2016, China Academic Journal Electronic Publishing House, 7 Pages.
Alatrash et al., "Generator Emulation Controls for Photovoltaic Inverters", IEEE Transactions on Smart Grid, vol. 3, No. 2, Jun. 2012, p. 996 to 1011.
Beck et al., "Virtual Synchronous Machine", 9th International Conference, Electrical Power Quality and Utilisation, Barcelona, Spain Oct. 9-11, 2007, 6 pages.
Bevrani et al., "Virtual synchronous generators: A survey and new perspectives", Electrical Power and Energy Systems 54 (2014), University of Kurdistan Dept. of Electrical and Computer Engineering Smart/Micor Grid Research Center, p. 244-254.
Cao, "Virtual admittance Based Current Control Strategy for Gridconnected inverters in Microgrid", Shijiazhuang University of Economics, Electrical Review, ISSN 0033-2097, R 87 NR 12a/2011, p. 117 to 120.
D'Arco et al., "Virtual Synchronous Machines—Classification of Implementations and Analysis of Equivalence to Droop Controllers for Microgrids", 2013 IEEE Grenoble Conference, Grenoble, 2013, pp. 1-7.
De Brabandere et al., "A Voltage and Frequency Droop Control Method for Parallel Inverters," in IEEE Transactions on Power Electronics, vol. 22, No. 4, pp. 1107-1115, Jul. 2007.
Natarajan et al., "Synchronverters With Better Stability Due to Virtual Inductors, Virtual Capacitors, and Anti-Windup," in IEEE Transactions on Industrial Electronics, vol. 64, No. 7, pp. 5994-6004, Jul. 2017.
Rocabert et al., "Control of Power Converters in AC Microgrids," in IEEE Transactions on Power Electronics, vol. 27, No. 11, pp. 4734-4749, Nov. 2012.
Sun et al., "New Perspectives on Droop Control in AC Microgrid," in IEEE Transactions on Industrial Electronics, vol. 64, No. 7, pp. 5741-5745, Jul. 2017.

* cited by examiner

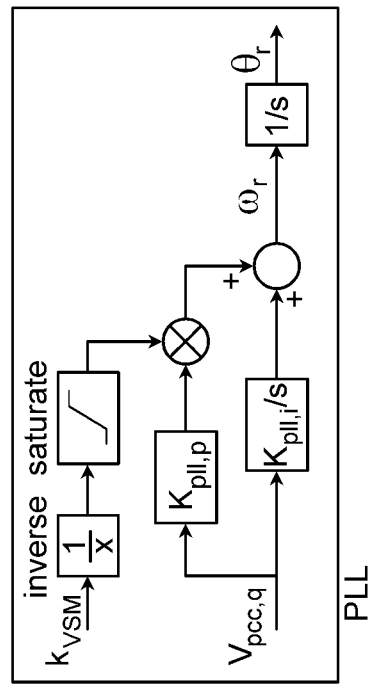
PLL
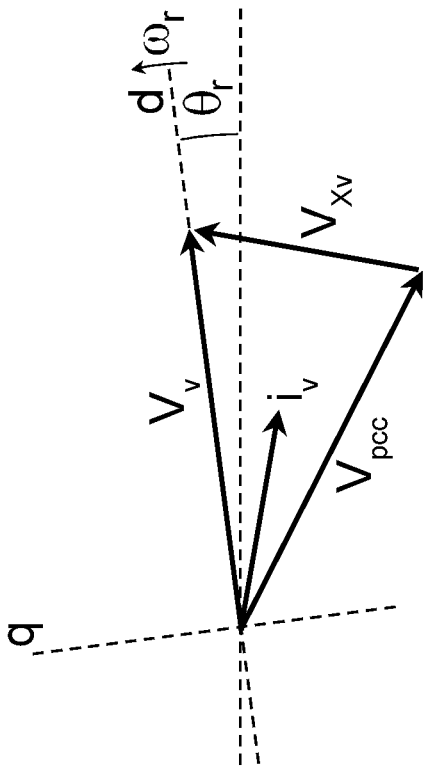
Fig. 7
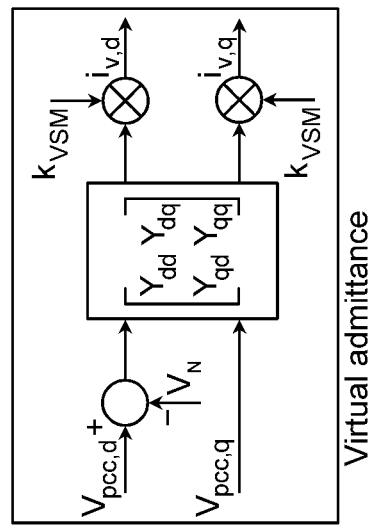
Fig. 8
Virtual admittance
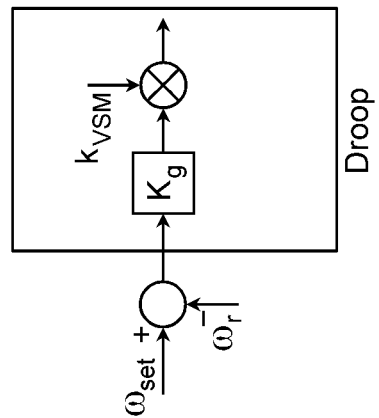
Droop

GRID FORMING VECTOR CURRENT CONTROL

CROSS-REFERENCE TO RELATED APPLICATIONS

The present application is a national stage entry of International Patent Application No. PCT/EP2020/083499, filed on Nov. 26, 2020, which claims priority to European Patent Application No. 19212967.4, filed on Dec. 2, 2019, which are both incorporated herein by reference as if set forth in full.

BACKGROUND

Field of the Invention

The present disclosure relates to a system and method for a grid forming vector current control.

Description of the Related Art

The rate of change of the transmission and distribution grid is traditionally high. Conventional generation with synchronous generators is replaced more and more by converter-interfaced renewable energy resources. It has been shown in many studies that there is a risk of grid instability if the utility grid is equipped with a high amount of renewable energy resources that do not employ any grid supporting control strategy. The reason of the instability is that such resources do not adapt their power injection to the grid according to the actual power demand in the grid.

Such grid-agnostic current/power control strategies were common in most converter-interfaced applications for a long time. However, in the last decades, more stringent regulations have been put in place, e.g. for PV inverters. Today, PV inverters have to gradually reduce the injected active power if the grid frequency increases above nominal. This behaviour is a first step into the direction of grid-supporting power converter control. The injected active power is slowly adapted in response to the actual needs of the grid. Such a simple method only provides steady-state grid support, i.e. it still relies on synchronous generators in the grid that take over transient load changes.

In the meantime, more sophisticated converter control methods have been developed for insular grids, microgrids and railway grids. These control methods aim to provide not only steady-state grid support but also transient grid support. Converter-interfaced energy resources with such control methods are able to fully replace conventional synchronous generators in the grid. It is possible to run a grid without any conventional synchronous generator connected to it, a situation that has become common e.g. in railway grids already.

In order to provide a full grid support, it is necessary that the amount of injected power to the grid is adapted according to the demand of the various loads connected to the grid. This is achieved by changing the behaviour from grid-agnostic constant power injection to a behaviour that is closer to a voltage source. The converters equipped with such control methods adapt and share the injected power automatically such that they provide the actual power demanded from the various loads in the grid.

Because of backwards-compatibility reasons with legacy equipment in AC power generation and distribution, the control methods aim to provide "inertia" to the grid, meaning that the rate of change of the grid frequency is limited. The combined effect of voltage source characteristics and inertia leads to characteristics that are very close to the behaviour of a synchronous generator. Such control methods provide full grid support and can fully replace synchronous generators in the grid.

In general, control mechanisms according to the state of the art may be classified into two main groups.

In droop control approaches, the control law is based on the steady-state coupling of frequency (or angle) and power flow in inductive grids. Various implementation variants exist and several ways of improving the method have been proposed over the last years. In most implementation variants, the method creates a voltage reference which has to be tracked with additional cascaded voltage- and current control loops. In this respect, reference is made to the documents [1] and [3].

In virtual generator approaches as described e.g. in [2], the control law is based on the principle of emulating the behaviour of a synchronous generator. The mathematical model describing the behaviour of the generator is implemented in the controller directly. Various implementation variants exist that differ mainly in the level of detail and the complexity of the implemented equations.

In order to emulate a virtual generator or virtual synchronous machine (VSM), the mathematical equations of a synchronous generator are implemented in a controller to emulate the behaviour of the generator. In the direct approach (voltage source type), the machine equations are solved for the stator voltage which is given as a reference either directly to the modulation stage or to subsequent cascaded voltage and current control loops. In the inverse method (current source type), the machine equations are solved for the stator currents which are given as references to subsequent current control loops.

However, both approaches cited above require various additional control loops in order to make the concept applicable. In particular, cascaded voltage and current control loops given by the direct method and provide current control including current limitation.

A current control loop and PLL track the active/reactive power references given by the inverse method and provide current control including current limitation. Also, grid synchronization and grid frequency measurement are provided.

A virtual impedance loop may emulate a virtual stator impedance.

Additional components may be used to improve the performance of the virtual generator. The additional components may be at least one of the following:

An additional PLL for the direct method for synchronization with the grid before closing the main circuit breaker (MCB) of the converter or during fault cases, an automatic voltage regulator (AVR) to improve the voltage regulation at the PCC and feedforward gains for the grid current and the PCC voltage to improve the performance of the PI control loops. A damper winding emulation is used to improve damping of low-frequency oscillations. In the simplest inverse method, the virtual inertia effect is emulated with a derivative of the measured grid frequency. Furthermore, low-pass filtering the virtual impedance reference is often required to reduce amplification of high frequency noise caused by the derivative used for the calculation of a virtual inductance.

However, systems according to the state-of-the-art may be difficult to tune and require a high commissioning effort. There may also be interactions between control loops due to insufficient bandwidth separation in converters with lower switching frequency. In regular systems, typically around 15 parameters have to be tuned with unknown interactions. In strong grids, insufficient reference tracking performance often occurs. Furthermore, a loss of synchronism during faults may appear.

As has just been discussed, grid supporting control methods become more and more important in various applications, such as grid connected battery energy storage (BESS), microgrids, PV inverters, railway interties, HVDC and UPS. Transmissions system operators in various countries are discussing about changing standards for grid connected energy resources in such a way that grid support becomes mandatory for all grid connected energy sources. Today's grid supporting control methods are predominantly based on two basic concepts, the "virtual generator" concept and the droop control concept. Both methods have several shortcomings such as high complexity, difficult tuning approach with high commissioning effort, and stability issues. Furthermore, the mentioned methods may not offer sufficient control performance at the same time in strong grids and in weak grids and therefore either need retuning or control mode changeover during islanding events.

SUMMARY

In the present disclosure, a novel generic grid forming/grid supporting control method is described. It is based on the emulation of the combined effect of a virtual machine and a parallel connected current source.

The method according to the present disclosure provides a simplified and reliable structure. It comes with less cascaded control loops, reduced complexity, integrated damping, integrated current control and simple tuning. Furthermore, it has good performance in both, weak and strong grids, and it enables islanded operation. The amount of grid support can be configured flexibly with a single parameter. Due to its simplicity, the novel control method reduces commissioning effort considerably. Due to its generic nature, it can be used in various applications with only minor modifications.

Embodiments are specified in the independent claims. Preferred embodiments are defined in the dependent claims. The system is directed towards a grid forming vector current control system configured to emulate a virtual synchronous machine (VSM). In particular, the disclosed system comprises a droop control unit, a current control unit, a virtual admittance unit and a phase locked loop (PLL) unit. The virtual admittance unit and the PLL unit are configured to emulate an inertia of the VSM. A virtual current source is connected in parallel to the VSM.

Various embodiments may preferably implement the following features:

An output signal of the droop control unit may preferably be connected to the virtual current source in order to emulate a speed governor.

Preferably, an output signal of the droop control unit is connected to the PLL unit in order to emulate a virtual mechanical speed governor.

The system may further comprises an active voltage regulator (AVR) unit.

The system is preferably deployed in at least one of a micro grid converter or a photovoltaic (PV) inverter or an uninterruptable power supply (UPS) or a grid intertie converter, or a railway grid intertie converter, or a high voltage direct current (HVDC) converter, or a battery energy storage system (BESS).

A factor $k_{VSM}$ may be configured to change the characteristics of the system continuously from voltage source to current source by proportionally scaling the output signals of the virtual admittance with $k_{VSM}$.

The factor $k_{VSM}$ is preferably fed into at least one of the droop control unit, the virtual admittance unit or the PLL unit in order to increase or decrease the inertial response of the system to disturbances in a main grid. Preferably at least one of the micro grid converter, or the PV inverter, or the UPS, or the grid intertie converter, or the railway grid intertie converter, or the HVDC converter, or the BESS is connected to the main grid. More preferably, the micro grid converter, PV inverter or UPS is connected to the main grid.

Preferably, $k_{VSM}$ scales a nominal power of the VSM by proportionally scaling the output signals of the virtual admittance with $k_{VSM}$, inversely proportionally scaling the proportional gain of the PLL with $k_{VSM}$, and/or proportionally scaling a droop constant with $k_{VSM}$.

The factor $k_{VSM}$ preferably scales at least one of a spinning wheel factor or a transient power or the inertia.

The droop control unit may comprise a fast current source. The AVR unit may be configured to keep a magnitude of a voltage at a Point of Common Coupling (PCC) constant.

The PLL unit is preferably configured to measure a voltage at a Point of Common Coupling (PCC).

The disclosure further relates to a method for controlling a grid forming vector current control emulating a Virtual Synchronous Machine (VSM). The method comprises providing a droop control unit, providing a current control unit, providing a virtual admittance unit and providing a phase locked loop (PLL) unit. An inertia of the VSM is emulated and a virtual current source connected in parallel to the VSM is controlled.

Various embodiments may preferably implement the following features:

Emulation of the inertia of the VSM may preferably be achieved with the virtual admittance unit and the PLL unit.

An output signal of the droop control unit is preferably connected to the virtual current source in order to emulate a speed governor.

An output signal of the droop control unit is preferably connected to the PLL unit in order to emulate a virtual mechanical speed governor.

A factor $k_{VSM}$ may change the characteristics of the system continuously from voltage source to current source by proportionally scaling the output signals of the virtual admittance with $k_{VSM}$.

BRIEF DESCRIPTION OF DRAWINGS

Embodiments will be described with reference to the appended figures, in which

FIG. 7 depicts a vector diagram for a transient situation, FIG. 8 is a block diagram showing the usage of a factor $k_{VSM}$ to adjust an amount of grid support.

DETAILED DESCRIPTION

Figure 1A:
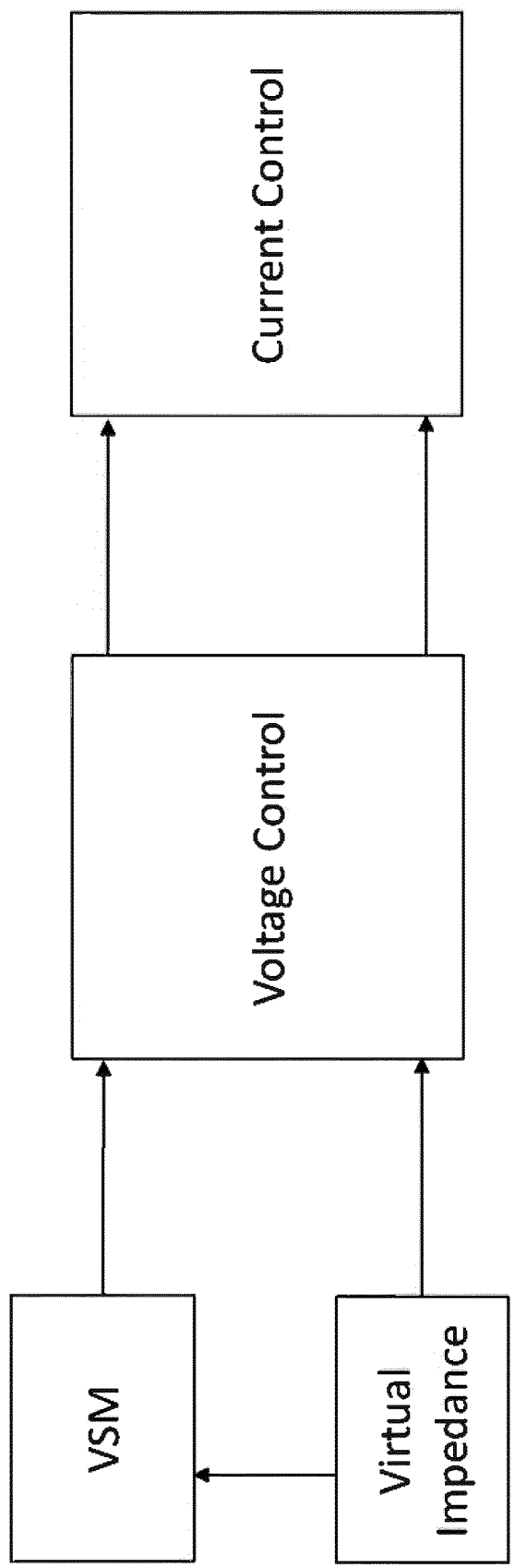
FIGS. 1a and 1b show schematic diagrams according to the prior art.
Figure 1B:
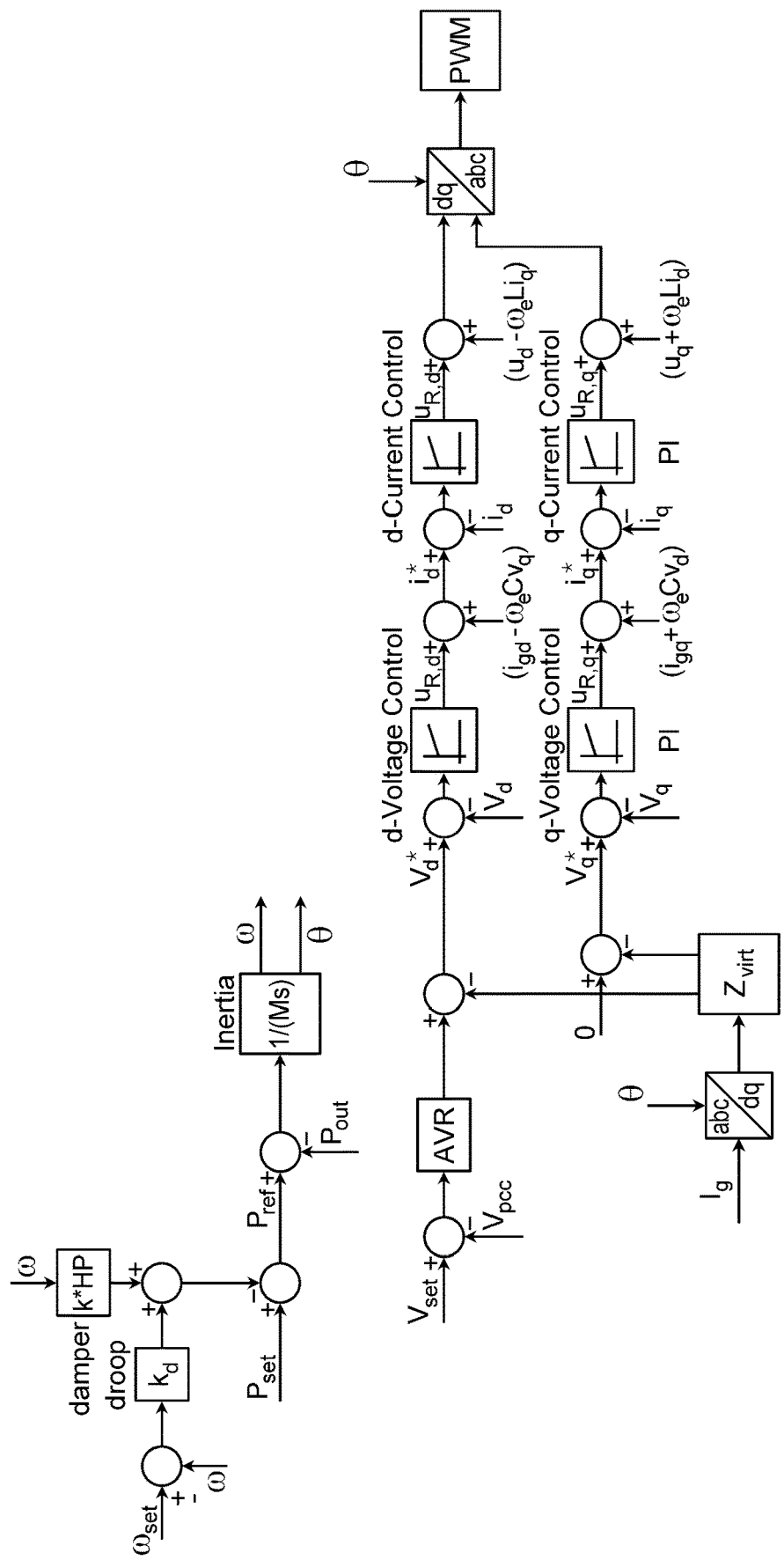

FIG. 1a shows a scheme of a control system according to the prior art. It employs a virtual impedance and a VSM. The outputs of both the VSM and the virtual impedance are fed into a cascaded voltage and current control. FIG. 1b is a more detailed view of the virtual generator control approach. As can be seen from the schematic, it is a rather complex structure with many parameters that have to be tuned and adapted to each other.

In the following, the terms block and unit may be used interchangeably and are not meant to be exclusive.

Figure 2B:
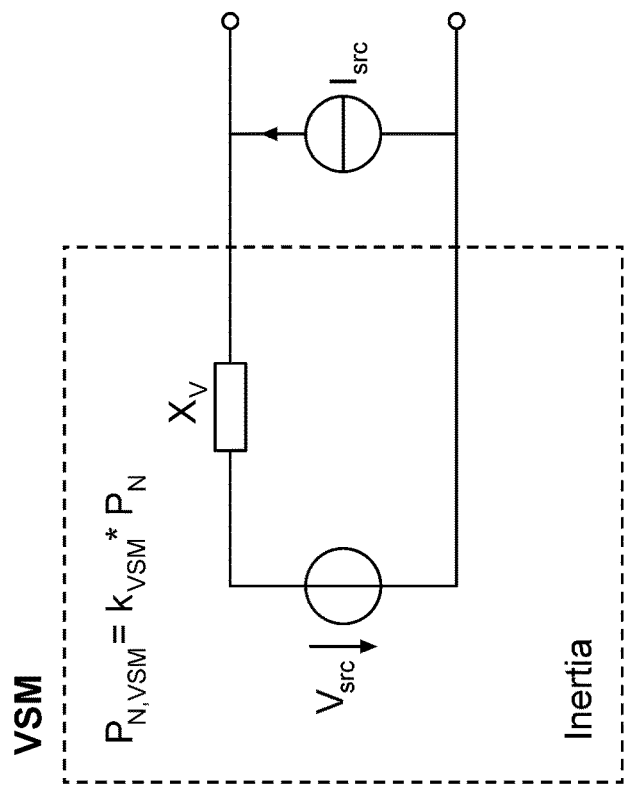
FIGS. 2a and 2b show schematic diagrams according to the present disclosure.
Figure 2A:
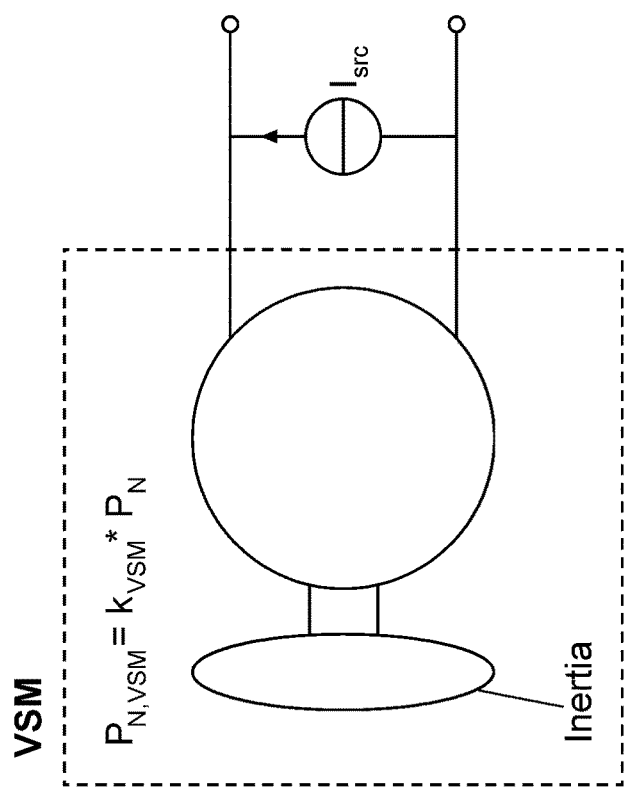

FIG. 2 schematically depicts the vector current control system according to the present disclosure. In particular, FIG. 2a shows a virtual synchronous machine (VSM) with a current source connected in parallel, while FIG. 2b shows the equivalent circuit diagram thereof. The system emulates the combined effect of a virtual machine, whose nominal power and amount of grid support can be scaled independently and online with a single input/parameter and a parallel connected current source. Thus, the system may be controlled remotely. For certain aspects, e.g. fault handling, it may be preferable to change the nominal power and amount of grid support within the application code.

Figure 3B:
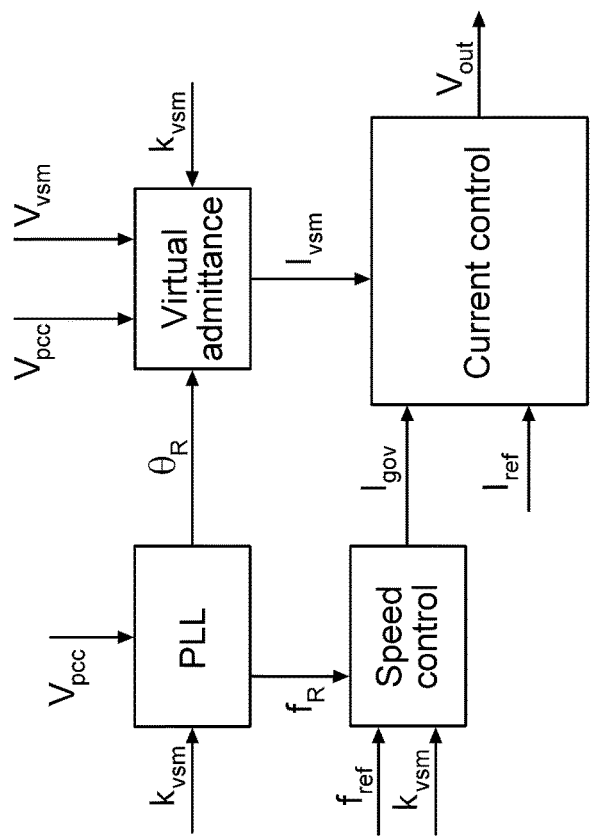
FIGS. 3a and 3b show schematic block diagrams according to an embodiment of the present disclosure.
Figure 3A:
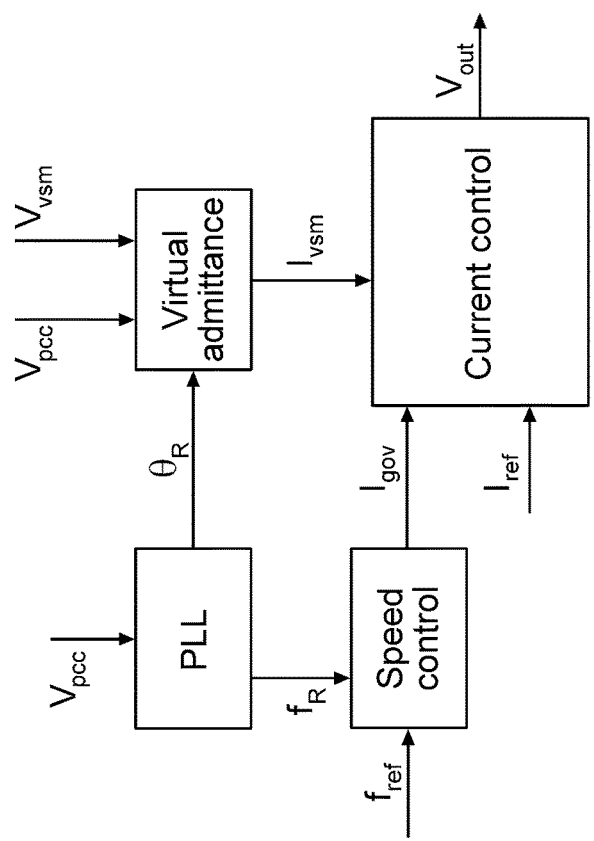

In more detail, the disclosed system according to an exemplary embodiment uses control blocks as shown in FIG. 3 to emulate the proposed behaviour. The calculation thereof will be discussed below. FIG. 3a comprises a phase locked loop (PLL) block fed by a voltage at a point of common coupling (PCC) $V_{pcc}$ as well as a speed control block having a reference frequency $f_{ref}$ as an input. The output of the PLL is provided to a virtual admittance block together with $V_{pcc}$ and a voltage of the virtual synchronous machine $V_{vsm}$. The speed control output, the virtual admittance output as well as a reference current $I_{ref}$ are then processed in a current control block which outputs a voltage $V_{out}$.

FIG. 3b additionally comprises the parameter $k_{VSM}$ as an input to at least one of the PLL, speed control and current control blocks. Thereby, an amount of grid support of a main grid may be controlled. $k_{VSM}$ may also be used to smoothly change the characteristics of the control scheme from voltage source to current source, also supporting a mix of both characteristics. A smooth changeover to stiff current control can be beneficial during grid faults to keep synchronism with the grid. The control mode does not have to be changed.

The system may also comprise an active voltage regulator (AVR). The system according to the exemplary embodiment emulates the combined effects of virtual inertia, damper winding, virtual stator impedance, AVR and droop governor. Virtual inertia and damper winding are emulated using the standard PLL block.

Opposite to conventional virtual machine implementations, the active power setpoint tracking and the droop governor are conceptually implemented with a fast current source. Therefore, there is no performance degradation in strong grids which can be often observed when using VSM control. Thus, a good performance in weak and in strong grids is achieved. The method supports unplanned islanding and islanded operation.

The complexity of the control scheme and the related commissioning effort is very low. Due to the removal of a cascaded voltage control loop and by reusing the PLL to emulate inertia and damping, the number of parameters can be reduced from more than 15 in conventional approaches to only 7 parameters with clear meaning and less interactions. Therefore, the system may also be tuned more easily.

Further advantages of the proposed concept are the possibility to configure the amount of grid support with a single parameter to simplify offering of grid supporting features in applications with low energy storage such as UPS in data centers, PV with low or no storage, EV charging with buffer battery, insensitive loads etc. as well as a smooth transition in and out of operation with maximum current without losing synchronism, thus improving the fault handling capability.

The system provides an explicit current control and current limitation and an explicit PLL for synchronization with the grid before closing an MCB and for preventing loss of synchronism during faults. The PLL together with the virtual admittance acts as a virtual swing equation, obviating synchronization using power balance.

FIGS. 4 to 6b show a more detailed overview of the proposed grid supporting control scheme and respective equivalent circuits.

Figure 4:
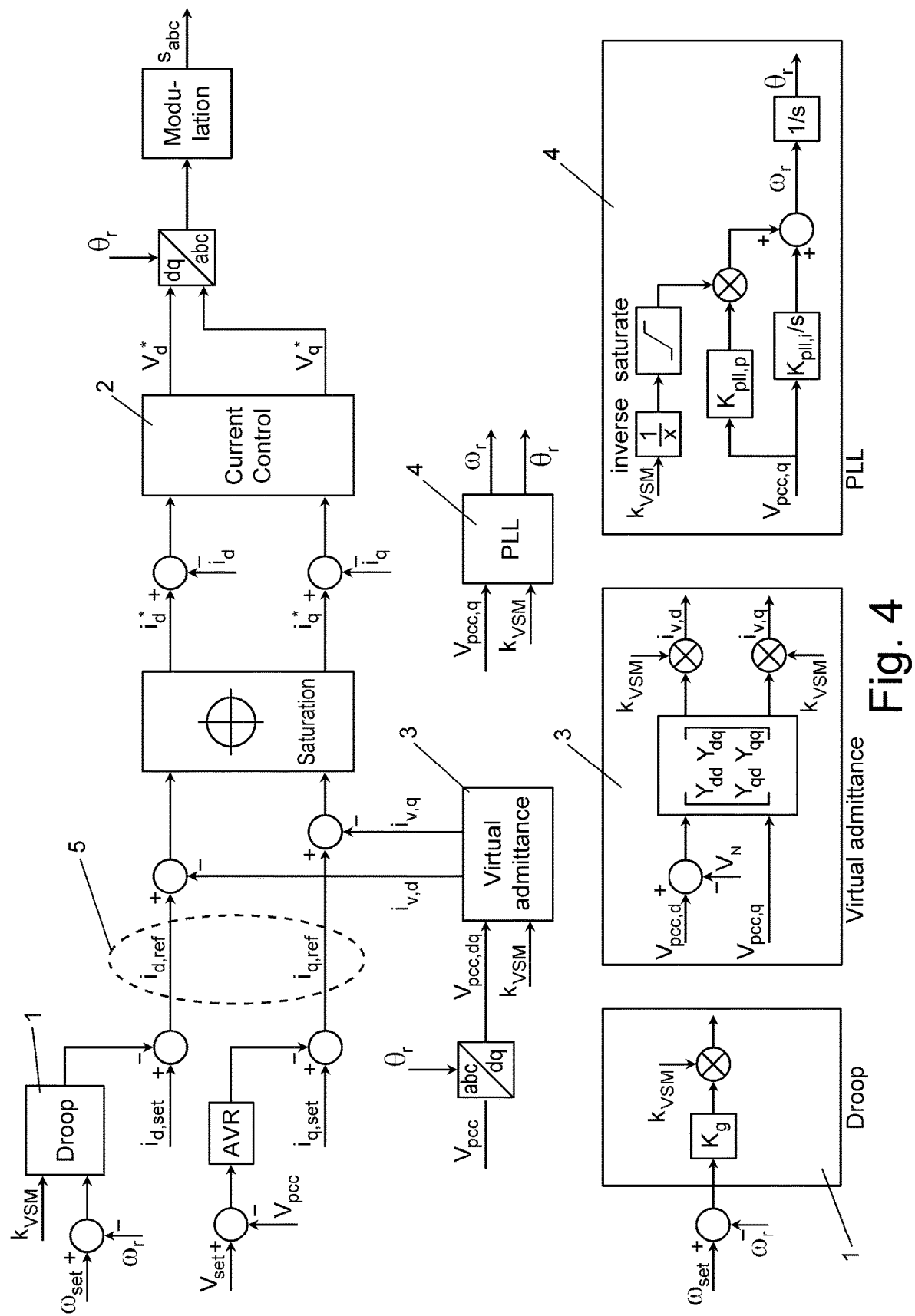
FIG. 4 shows the basic structure of the proposed grid supporting scheme.

The control scheme of FIG. 4 is conceptually depicted in FIGS. 2a and 2b. The control scheme of FIG. 2a can be separated into two functional parts being a VSM without any governor, i.e. a spinning wheel or inertia, respectively, as shown by the dotted line and a current source connected in parallel at the terminals of the virtual synchronous machine. The behaviour of the virtual synchronous machine is emulated with the PLL. The current source is working in parallel. It acts simultaneously as a fast power setpoint tracker and as a governor, because it ensures steady-state power balance between the grid and the spinning wheel. The inertial response with respect to the active power is ensured by the virtual admittance. In the steady state, the complete power flowing to the grid is injected by the current source. The spinning wheel injects power only during transients.

FIG. 4 shows a system according to an embodiment having a droop control unit 1, a current control unit 2, a virtual admittance unit 3 and a phase locked loop (PLL) unit 4. The virtual admittance unit 3 and the PLL unit 4 are configured to emulate an inertia of the VSM and a virtual current source 5 is connected in parallel to the VSM. In this embodiment, an output signal of the droop control unit 1 is connected to the virtual current source 5 in order to emulate a speed governor.

The system according to a preferred embodiment will now be described in more detail. The simplest form of traditional state-of-the-art implementations of a virtual synchronous machine are based on the swing equation. The goal of virtual synchronous machine control is to make the behaviour of the converter at the point of common coupling (PCC) equal to the behaviour of a synchronous machine.

Figure 5A:
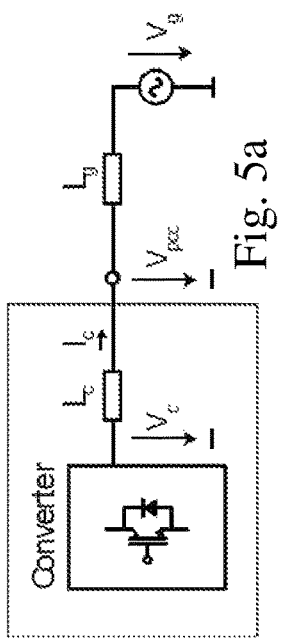
FIGS. 5a to 5c show virtual machine variants.
Figure 5B:
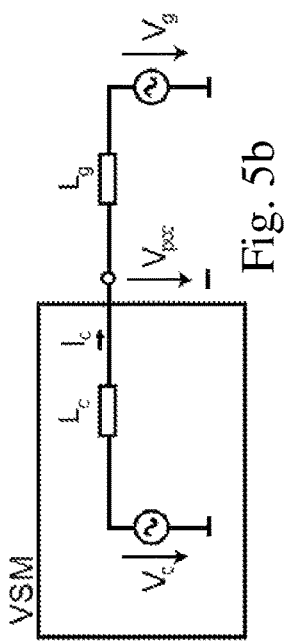
Figure 5C:
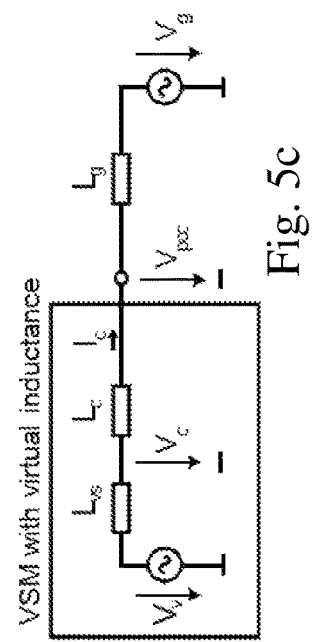

FIGS. 5a to 5c are equivalent circuits of respective components, i.e. state-of-the-art virtual machine variants, depicted in FIGS. 1a and 1b. In particular, FIG. 5a shows a converter, FIG. 5b shows a VSM without virtual inductance and FIG. 5c shows a VSM with virtual inductance.

The following derivations are based on a converter with an inductive output filter for simplicity reasons. However, the control method proposed herein is suitable for converters with any type of output filter structure, such as L, LC or LCL.

The swing equation couples the change of frequency of the voltage source $V_C$ with the active power flowing out or into the machine. In the case of a VSM without virtual inductance, the converter voltage $V_C$ is equal to the back electromotive force (back-emf) of the virtual machine. The converter filter inductance $L_C$ is equal to the stator inductance of the virtual machine and the PCC voltage $V_{pcc}$ is equal to the stator voltage of the virtual machine. The converter voltage $V_C$ (virtual back-emf) has the rotational frequency $\omega_r$ to highlight its equivalency with the virtual rotor frequency. The PCC voltage (virtual stator voltage) has the rotational frequency $\omega_{pcc}$. The swing equation looks as follows:

$$M \cdot \frac{d\omega_r}{dt} = -P_{out} + \overbrace{P_{set}}^{setpoint} - \overbrace{K_g(\omega_r - \omega_{set})}^{governor} - \overbrace{K_f(\omega_r - \omega_{pcc})}^{damper\ winding} \quad (1)$$

$$\frac{d\theta_r}{dt} = \omega_r \quad (2)$$

In quasi steady-state, the power flow is given by the angle difference between the virtual back-emf $V_C$ and the PCC voltage $V_{pcc}$ across the converter filter reactance $X_C = \omega_N * L_C$.

$$P_{out} = \frac{V_C V_{pcc}}{X_C} \sin(\theta_r - \theta_{pcc}) \quad (3)$$

There is a direct dependency of the power flow, the reactances and the angle differences across parts of the transmission line, i.e.

$$P_{out} = \frac{V_C V_{pcc}}{X_c} \sin(\theta_r - \theta_{pcc}) = \frac{V_{pcc} V_g}{X_g} \sin(\theta_{pcc} - \theta_g) = \frac{V_C V_g}{X_C + X_g} \sin(\theta_r - \theta_g) \quad (4)$$

The swing equation thus becomes $$\frac{d\omega_r}{dt} = -\frac{V_C V_{pcc}}{MX_C} \sin(\theta_r - \theta_{pcc}) + \quad (5)$$

$$\frac{1}{M} \overbrace{P_{set}}^{setpoint} - \frac{1}{M} \overbrace{K_g(\omega_r - \omega_{set})}^{governor} - \frac{1}{M} \overbrace{K_f(\omega_r - \omega_{pcc})}^{damper\ winding}$$

$$\frac{d\theta_r}{dt} = \omega_r$$

In a second step, state-of-art VSM implementations have introduced a virtual reactance $X_{vs} = \omega_N * L_{vs}$ according to FIG. 5c. The virtual reactance changes the equations slightly. The converter voltage $V_C$ in phasor notation is calculated according to $$V_C = V_v - jX_{vs} \cdot I_c \quad (6)$$

The virtual back-emf of the machine is designated as $V_v$ (with rotational frequency (or and angle $\theta_r$) and has moved behind the virtual reactance $X_{vs}$. Regarding the behaviour at the PCC, the virtual machine has now a total virtual stator reactance of $X_v = X_c + X_{vs}$ and the power flow equation changes to $$P_{out} = \frac{V_v V_{pcc}}{X_{vs} + X_c} \sin(\theta_r - \theta_{pcc}) = \frac{V_v V_{pcc}}{X_v} \sin(\theta_r - \theta_{pcc}) \quad (7)$$

and the swing equation becomes $$\frac{d\omega_r}{dt} = \quad (8)$$

$$-\frac{V_v V_{pcc}}{MX_v} \sin(\theta_r - \theta_{pcc}) + \frac{1}{M} \overbrace{P_{set}}^{setpoint} - \frac{1}{M} \overbrace{K_g(\omega_r - \omega_{set})}^{governor} - \frac{1}{M} \overbrace{K_f(\omega_r - \omega_{pcc})}^{damper\ winding}$$

$$\frac{d\theta_r}{dt} = \omega_r$$

It should be noted that the virtual inductance $L_{vs}$ is in series to the converter filter inductance $L_C$ and therefore adds to the total virtual stator inductance of the virtual machine seen from the PCC.

Figure 6A:
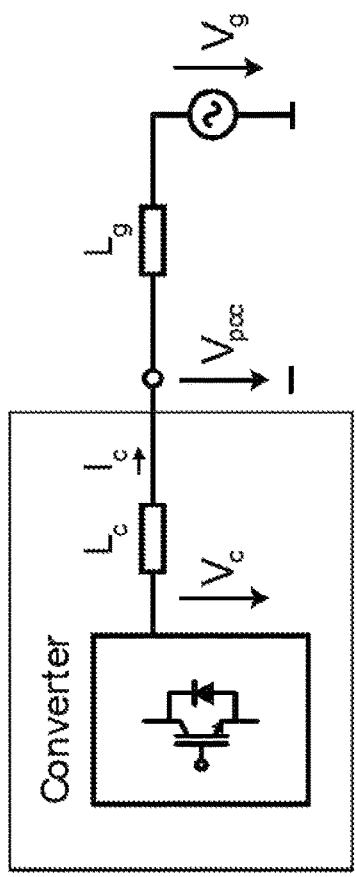
FIGS. 6a and 6b show equivalent models of the proposed control scheme.
Figure 6B:
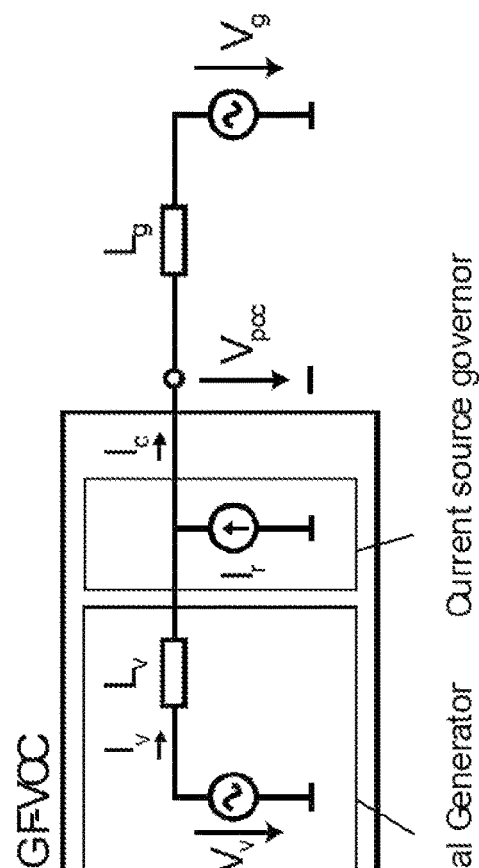

FIGS. 6a and 6b show an equivalent model of a control scheme according to an exemplary embodiment. Therein, the swing equation is not directly implemented as in traditional approaches. Moreover, the effect of the PLL together with the virtual admittance is compared to the swing equation. The angle $\theta_r$ is no longer computed by the swing equation, but it is the output of the PLL according to the PLL equations:

$$\omega_r = \left(K_{pll,p} + \frac{K_{pll,i}}{s}\right) \cdot V_{pccq} = -\left(K_{pllp} + \frac{K_{plli}}{s}\right) \cdot V_{pcc} \cdot \sin(\theta_r - \theta_{pcc}) \quad (9)$$

$$\frac{d\theta_r}{dt} = \omega_r$$

Calculating the derivative of equation (9) yields:

$$\frac{d\omega_r}{dt} = -(s \cdot K_{pll,p} + K_{pll,i}) \cdot V_{pcc} \cdot \sin(\theta_r - \theta_{pcc}) \quad (10)$$

$$\frac{d\theta_r}{dt} = \omega_r$$

For small angle differences (which is the case for reasonable PLL tuning), the sine function can be approximated as $\sin(\theta_r - \theta_{pcc}) \approx (\theta_r - \theta_{pcc})$ and the derivative thereof becomes $s \cdot \sin(\theta_r - \theta_{pcc}) \approx \omega_r - \omega_{pcc}$.

The equation set may thus also be formulated as follows:

$$\frac{d\omega_r}{dt} = -K_{pll,i} \cdot V_{pcc} \cdot \sin(\theta_r - \theta_{pcc}) - K_{pll,p} \cdot V_{pcc} \cdot (\omega_r - \omega_{pcc}) \quad (11)$$

$$\frac{d\theta_r}{dt} = \omega_r$$

By comparing equation (11) with the original swing equation (1), the PLL gains for formal equivalence of the two equations may be $$K_{pll,p} = \frac{K_f}{MV_{pcc}}, K_{pll,i} = \frac{V_v}{MX_v} \quad (12)$$

The governor power will be replaced with the parallel current source in a later step below. The proportional gain of the PLL therefore emulates the damper winding effect and the integral gain couples the angle difference with an increase/decrease of frequency, emulating the self-synchronization principle of synchronous machines.

Opposite to the swing equation, the PLL does not implicitly couple power flow with the angle difference, because it describes only the evolution of the internal PLL angle $\theta_r$. Coupling of power flow and angle difference has to be ensured explicitly with an additional current reference for the current controller. The reference is created with a virtual admittance being equivalent to the inverse of the virtual stator impedance, i.e.

$$Y_v(s) = Z_v(s)^{-1} \quad (13)$$

The stator impedance is assumed to be of RL-type. If the admittance is implemented in dq-reference frame it can be described as follows $$Z_v = \begin{bmatrix} R_v + s \cdot L_v & -\omega_N \cdot L_v \\ \omega_N \cdot L_v & R_v + s \cdot L_v \end{bmatrix} \quad (14)$$

$$Y_v = \begin{bmatrix} \frac{R_v + s \cdot L_v}{R_v^2 + 2L_vR_vs + L_v^2(s^2 + \omega_N^2)} & \frac{\omega_N L_v}{R_v^2 + 2L_vR_vs + L_v^2(s^2 + \omega_N^2)} \\ \frac{-\omega_N L_v}{R_v^2 + 2L_vR_vs + L_v^2(s^2 + \omega_N^2)} & \frac{R_v + s \cdot L_v}{R_v^2 + 2L_vR_vs + L_v^2(s^2 + \omega_N^2)} \end{bmatrix} \quad (15)$$

The current references $i_{v,dq}$ are created according to the matrix multiplication of the virtual admittance with the voltage difference between a virtual back-emf voltage $V_v$ aligned to the d-direction of the PLL reference frame ($V_v = V_N + j*0$) and the PCC voltage $V_{pcc}$ (this is shown in FIG. 7 depicting a vector diagram for a transient situation).

$$i_{v,d} = Y_{v,dd}(s) \cdot (V_{pcc,d} - V_N) + Y_{v,dq}(s) \cdot V_{pcc,q} \quad (16)$$

$$i_{v,q} = Y_{v,qd}(s) \cdot (V_{pcc,d} - V_N) + Y_{v,qq}(s) \cdot V_{pcc,q} \quad (17)$$

Alternatively, it is also possible to work with complex numbers and implement the admittance according to $$i_{v,d} + j \cdot i_{v,q} = \frac{1}{(R + s \cdot L_v + j \cdot \omega_N L_v)} \cdot ((V_{pcc,d} + j \cdot V_{pcc,q}) - (V_N + j \cdot 0)) \quad (18)$$

In the steady state and assuming that $R_v << \omega_N*L_v$, the admittance simplifies to $$Y_v \approx \begin{bmatrix} 0 & \frac{1}{\omega_N L_v} \\ -\frac{1}{\omega_N L_v} & 0 \end{bmatrix} \quad (19)$$

and thus leads to the following steady-state current references:

$$i_{v,d} = \frac{1}{\omega_N L_v} \cdot V_{pcc,q} \quad (20)$$

$$i_{v,q} = -\frac{1}{\omega_N L_v} \cdot (V_{pcc,d} - V_N) \quad (21)$$

If the PCC voltage $V_{pcc}$ is equal to the nominal voltage $V_N$, the injected q-axis current can be neglected. Thus, a coupling between q-voltage and active current in d-direction over the virtual stator reactance ($X_v = \omega*L_v$) may be described as $$i_{v,d} = \frac{1}{X_v} \cdot V_{pcc,q} = -\frac{V_{pcc}}{X_v} \sin(\theta_r - \theta_{pcc}) \quad (22)$$

wherein the related power flow (assuming fast current tracking) is $$P_{out} = V_v i_{v,d} = -\frac{V_v V_{pcc}}{X_v} \sin(\theta_r - \theta_{pcc}) \quad (23)$$

Therefore, according to the present disclosure, an equivalence between the quasi steady-state power flow governed by the swing equation and the power flow created by the PLL+virtual admittance combination is ensured.

The virtual admittance may be implemented with the full dynamic model to ensure passivity and damping of high frequency resonances. However, simplified admittance models (neglecting s*L terms) are also possible as are more complex models which permit additional filtering functions. Even asymmetric admittance is possible. The minimal requirement is to implement coupling between q-voltage and active current.

It has been shown that the combination of special settings for the PLL gains and a virtual admittance allows emulating the effect of inertia, damper winding and stator impedance of a virtual synchronous machine with the conventional control structure used for vector current control.

In the following, the droop block is further described. Different to the original VSM implementation, the proposed control method just implements a spinning wheel without a governor for the mechanical input power. Therefore, the injected power from the spinning wheel will be zero in steady-state ($i_{v,d}=0$) and the angle $\theta_r$ aligns with $\theta_{pcc}$.

The governor power is replaced by a current source ensuring the steady-state power balance. In addition to the reference coming from the virtual admittance, an active current reference is created according to $$i_{d,ref} = \frac{P_{set} + K_g \cdot (\omega_r - \omega_{set})}{V_{pcc,d}} = \frac{P_{set} + K_g \cdot (\omega_r - \omega_{set})}{V_{pcc} \cdot \cos(\theta_r - \theta_{pcc})} \quad (24)$$

which leads to an injected power of $$P = V_{pcc,d} i_{d,ref} = V_{pcc} \cos(\theta_r - \theta_{pcc}) \cdot i_{d,ref} = P_{set} + K_g \cdot (\omega_r - \omega_{set}) \quad (25)$$

The main difference is that this current reference is directly fed to the current controller, there is no filtering over the swing equation taking place. Set-point changes feed through directly and are followed much faster compared to conventional VSM implementations.

For reasonable loading conditions and reasonable virtual stator reactance of the spinning wheel, the angle difference $\theta_r-\theta_{pcc}$ is small and $\cos(\theta_r-\theta_{pcc})$ is close to unity. In that case, the division by $V_{pcc,d}$ can be replaced with a division by constant $V_N$.

Furthermore, an active voltage regulator (AVR) may be added to keep the magnitude of the PCC voltage constant. The AVR block could be of PI, or integrator (I) type, or proportional type (P) only. It creates a q-current reference $i_{qref}$ which is used to regulate the voltage magnitude.

$$i_{qref} = G_{avr}(s) \cdot (|V_{pcc}| - V_N) \quad (26)$$

However, the AVR block can also be omitted since the virtual admittance already implements a proportional gain AVR effect with $$i_{v,q} = -\frac{1}{\omega_1 L_v} \cdot (V_{pcc,d} - V_N) \quad (27)$$

As has been indicated above, a factor $k_{VSM}$ may be used. The factor $k_{VSM}$ may be configured to change the characteristics of the system continuously from voltage source to current source by proportionally scaling the output signals of the virtual admittance with $k_{VSM}$.

The factor $k_{VSM}$ can be fed into at least one of the droop block, the virtual admittance block or the PLL block as described throughout the specification in order to increase or decrease the inertial response of the system to disturbances in a main grid to which the micro grid converter, PV inverter, UPS or similar is connected. Preferably at least one of the micro grid converter, or the PV inverter, or the UPS, or the grid intertie converter, or the railway grid intertie converter, or the HVDC converter, or the BESS is connected to the main grid. More preferably, the micro grid converter, PV inverter or UPS is connected. Therein, $k_{VSM}$ may scale a nominal power of the VSM by proportionally scaling the output signals of the virtual admittance with $k_{VSM}$, inversely proportionally scaling the proportional gain of the PLL with $k_{VSM}$, and/or proportionally scaling a droop constant with $k_{VSM}$.

$k_{VSM}$ may also be used to adjust or scale the amount of grid support. Preferably, the factor $k_{VSM}$ is continuous and ranges from 0 to 1. With this factor it is possible to scale the nominal power of the virtual machine that can be thought to operate in parallel to the current source with a single factor. The connections and inputs of $k_{VSM}$ are shown in FIG. 3b. The equations are as follows:

$$Y_{virt} = k_{VSM} \cdot Y_{virt,N} \quad (28)$$

$$M = k_{VSM} \cdot M_N \quad (29)$$

$$K_g = k_{VSM} \cdot K_{g,N} \quad (30)$$

$$K_{pll,i} = \frac{3}{2} \cdot \frac{V_N}{k_{VSM} \cdot M_N \frac{1}{k_{VSM} \cdot Y_{virt,N}}} = \frac{3}{2} \cdot \frac{V_N}{M_N \cdot Z_{virt,N}} = K_{pll,i,N} \quad (31)$$

$$K_{pll,p} = K_f \cdot \frac{1}{k_{VSM} \cdot M_N \frac{3}{2} V_N} = \frac{1}{k_{VSM}} \cdot K_{pll,p,N} \quad (32)$$

With reference to FIG. 4, the modified block diagrams of the droop block, the virtual admittance block and the PLL block are shown in FIG. 8.

It is important to saturate the inverse of $k_{VSM}$ used in the PLL block to a maximum value to keep the PLL loop stable. A too high proportional gain of the PLL loop can lead to instability, a well-known effect of standard vector current control with PLL.

It should be noted that adjusting the amount of grid support by scaling the nominal power of the VSM is a unique feature of the control structure of the present disclosure. The nominal power of the parallel current source is not affected, and the control structure can therefore continue to operate with conventional current control and with maximum power capability, even if $k_{VSM}$ is set to zero.

This feature may not be realised with conventional VSM implementations. With a standard VSM, the power transfer capability is linked to the nominal power of the VSM. The power flow is controlled by advancing the angle of the virtual back-emf in VSM and the voltage difference is applied over the virtual stator reactance. Reducing the nominal power of the VSM leads to an increase of the reactance and consequently, an increased angle difference is required to transfer the same amount of power. Because the maximum angle difference is limited to 90°, the power transfer capability reduces with the nominal power of the VSM. Consequently, the nominal power of the VSM cannot be independently adjusted in conventional control approaches. Other applications than the ones disclosed herein may also be feasible.

Figure 9:
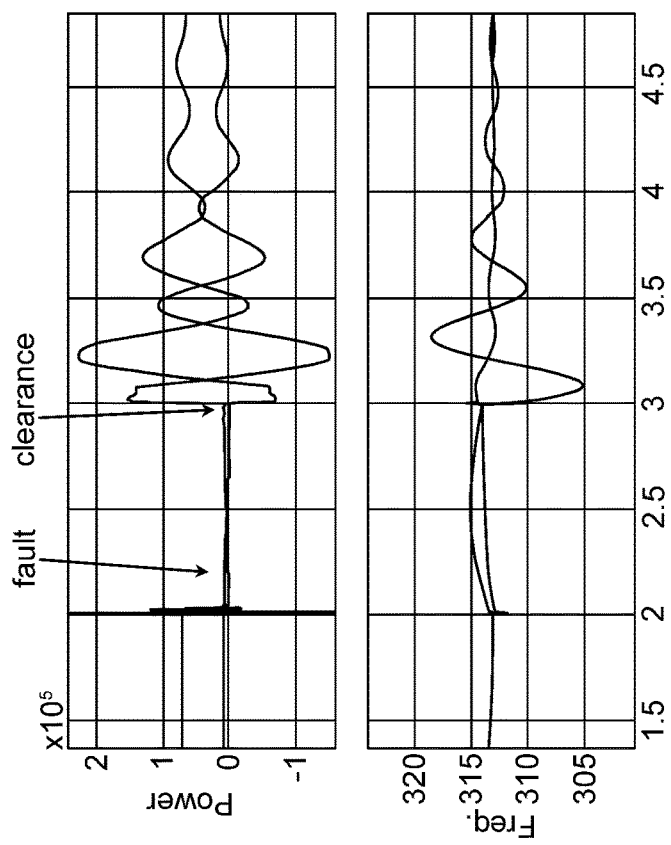

A possible application during a fault event and subsequent resynchronization after clearance of the fault is shown in FIG. 9. Without reducing the $k_{VSM}$ factor (similar to standard VSM behaviour), heavy oscillations are triggered after clearance of the fault because the synchronization between the grid and the VSM has been lost while the PCC voltage was close to zero.

Figure 10:
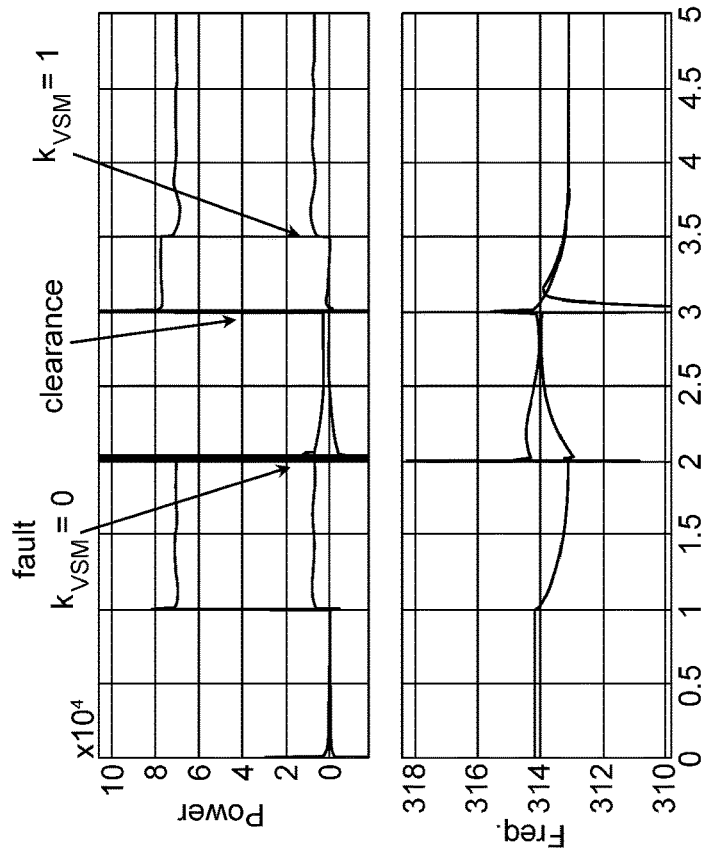
FIGS. 9 and 10 are diagrams showing the response of the system to a fault and the clearing thereof with different settings.

In contrast, if the $k_{VSM}$ factor is reduced to zero during the LVRT event, smooth resynchronization is achieved and no oscillations in between the converter and the grid after fault clearance is observed. This can be seen from the graphs in FIG. 10 showing the behaviour of the proposed control system. Due to the temporary reduction of $k_{VSM}$, the control characteristics has turned into a conventional stiff current control scheme with controllable and preferred behaviour during fault events. It is possible to inject reactive current during the LVRT event or impress any other predefined current reference.

The grid support may also be run with reduced nominal power, e.g. 10-20%, in applications that have only low energy storage capability, such as in UPS systems or in PV with low or no energy storage. A certain percentage of the nominal power could be reserved for grid support whereas the remaining power requirement of the application is handled with conventional current control.

Figure 11B:
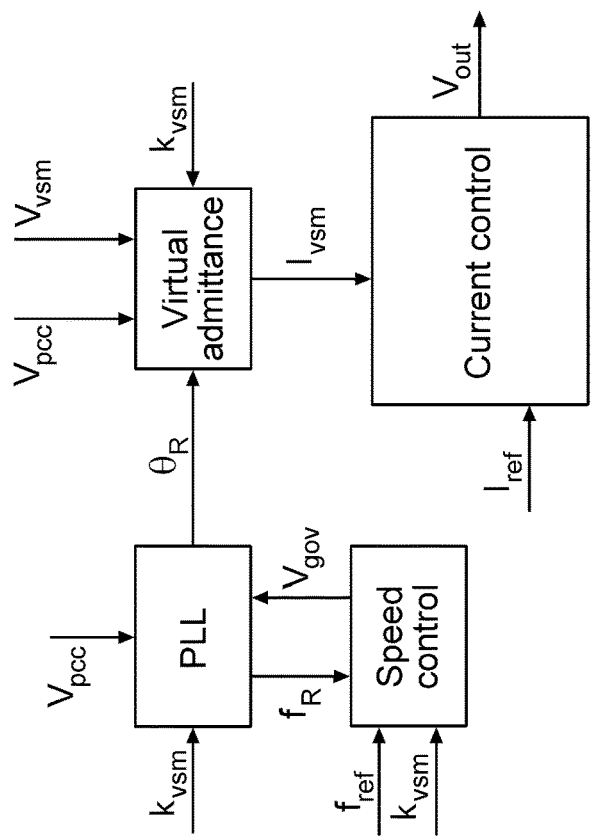
FIGS. 11a and 11b show schematic block diagrams according to another embodiment of the present disclosure.
Figure 11A:
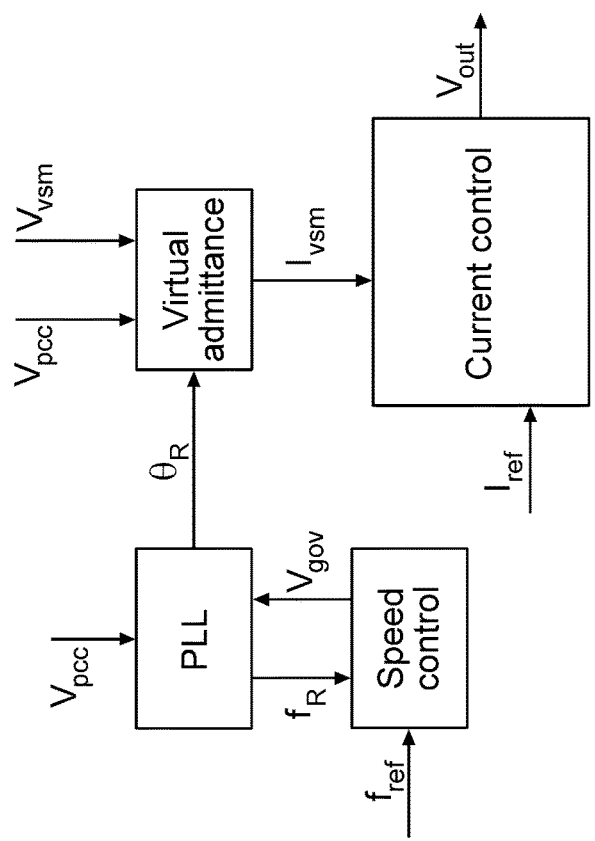

FIGS. 11a and 11b show another preferred embodiment of the present disclosure as a schematic block diagram. In particular, FIG. 11a relates to an alternative implementation with a virtual mechanical governor instead of a current source governor. This is inter alia achieved by connecting the output signal of the droop control block to the PLL block. Thereby, a virtual mechanical speed governor is emulated. Analogously to the control scheme as shown in FIG. 3a, the factor $k_{VSM}$ may also be fed into the PLL block and/or the speed control block and/or the virtual admittance block. The description of features that correspond to the first embodiment will be omitted.

Figure 12:
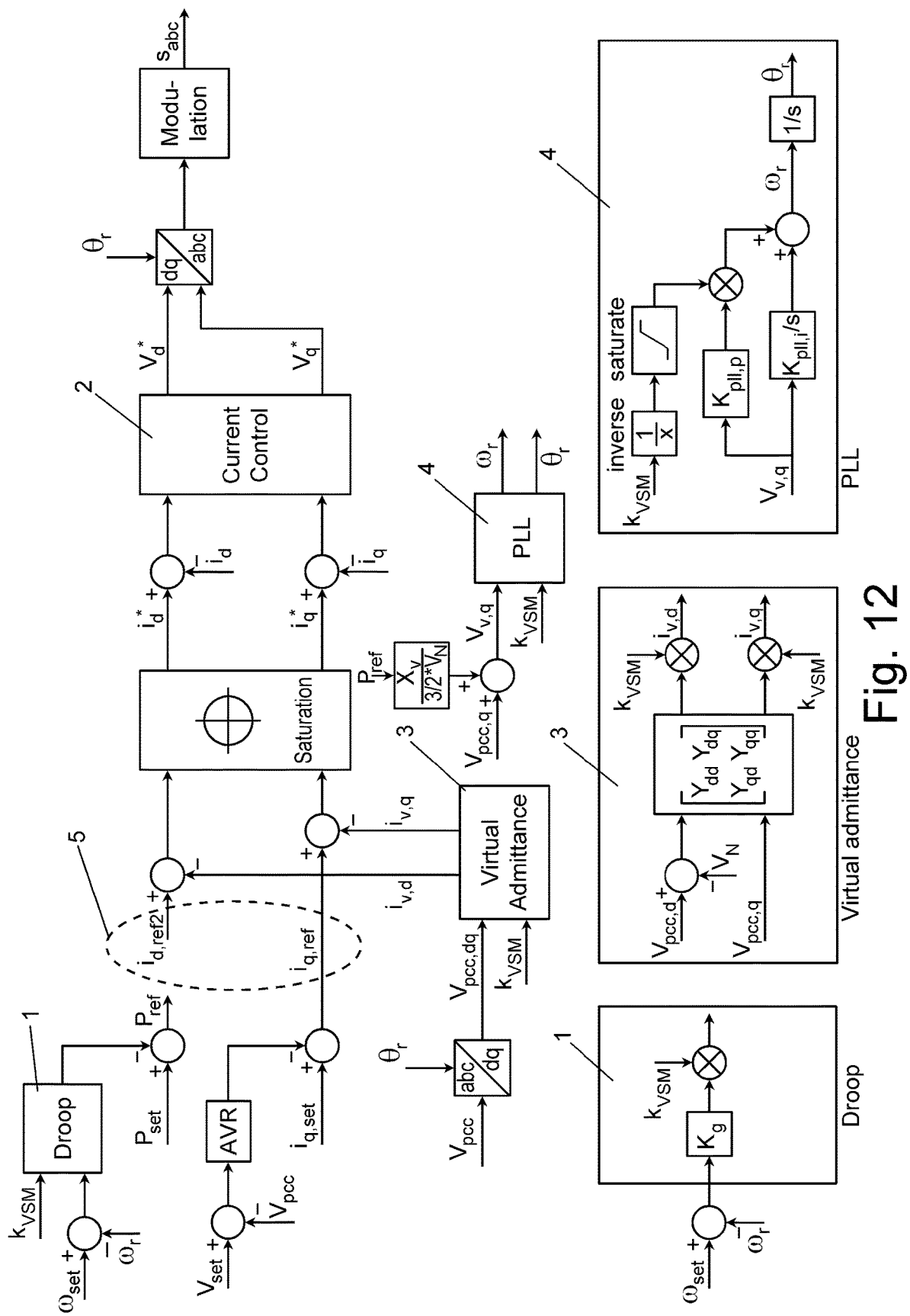
FIG. 12 shows an alternative implementation of the proposed control concept.

FIG. 12 shows the alternative configuration with respect to the scheme proposed in FIG. 4. Instead of using the current source as a governor, a virtual mechanical governor can be implemented that changes the power flow by advancing or delaying the rotor angle of the VSM. This is achieved by removing the direct connection of the droop block to the current controller. Instead, an additional input is required for the PLL block that turns the governor power reference $P_{ref}$ into a virtual rotor angle shift.

In other words, FIG. 12 shows a system according to an embodiment having a droop control unit 1, a current control unit 2, a virtual admittance unit 3 and a phase locked loop (PLL) unit 4. The virtual admittance unit 3 and the PLL unit 4 are configured to emulate an inertia of the VSM and a virtual current source 5 is connected in parallel to the VSM. In this embodiment, an output signal of the droop control unit 1 is connected to the PLL unit 4 in order to emulate a virtual mechanical speed governor.

The following applies to both embodiments and control methods, respectively. A current source may be connected in parallel to the VSM by using the input $i_{d,ref2}$ to the current controller which can be manipulated independently of the VSM. It is still possible to adjust the nominal power of the VSM with the factor $k_{VSM}$. However, with reduced nominal power $P_{N,VSM}$ of the VSM, $P_{set}$ can only be varied inside the range of $+-P_{N,VSM}$, otherwise the VSM could be overloaded due to the increased virtual reactance. To utilize the full power capability of the converter, it is required to work with the current source input $i_{d,ref2}$, which is independent of the nominal power of the VSM.

Optionally, an active damping branch (e.g. a virtual damping resistor) may be connected in parallel to the current source. Thus, $$i_{ad,dq} = Ga_{d,dq}(s) \cdot V_{pcc,dq} \quad (33)$$

Such an active damping branch usually employs a band-pass filter such that it is effective only in a certain frequency range. The difference to the virtual stator impedance introduced before is that the active damping branch is multiplied with the PCC voltage directly, without calculating the voltage difference between PCC voltage and virtual back-emf voltage $V_v$. It therefore creates a current in another direction than the virtual stator impedance, i.e. for a virtual resistor, the damping current is in phase with the PCC voltage. The active damping branch is not affected by the scaling of the nominal power of the VSM with the factor $k_{VSM}$ introduced elsewhere herein, it is therefore also active if the VSM effect is set to zero. The active damper branch could potentially be used in both embodiments, i.e. the variant using a current source governor and the variant using the virtual mechanical governor.

Figure 13:
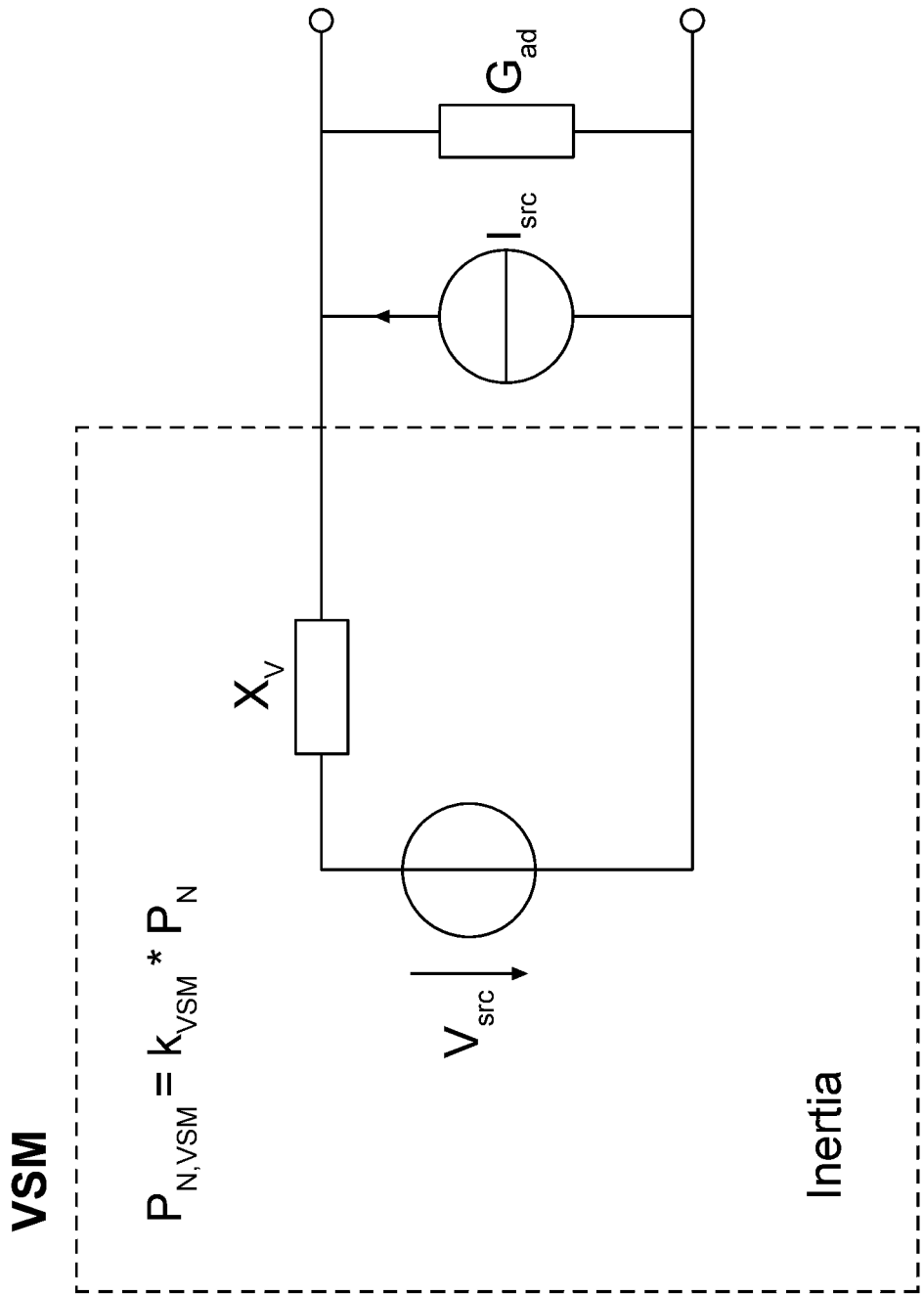
FIG. 13 is an equivalent circuit of the control concept with an optional active damper in parallel to the current source.
Figure 14:
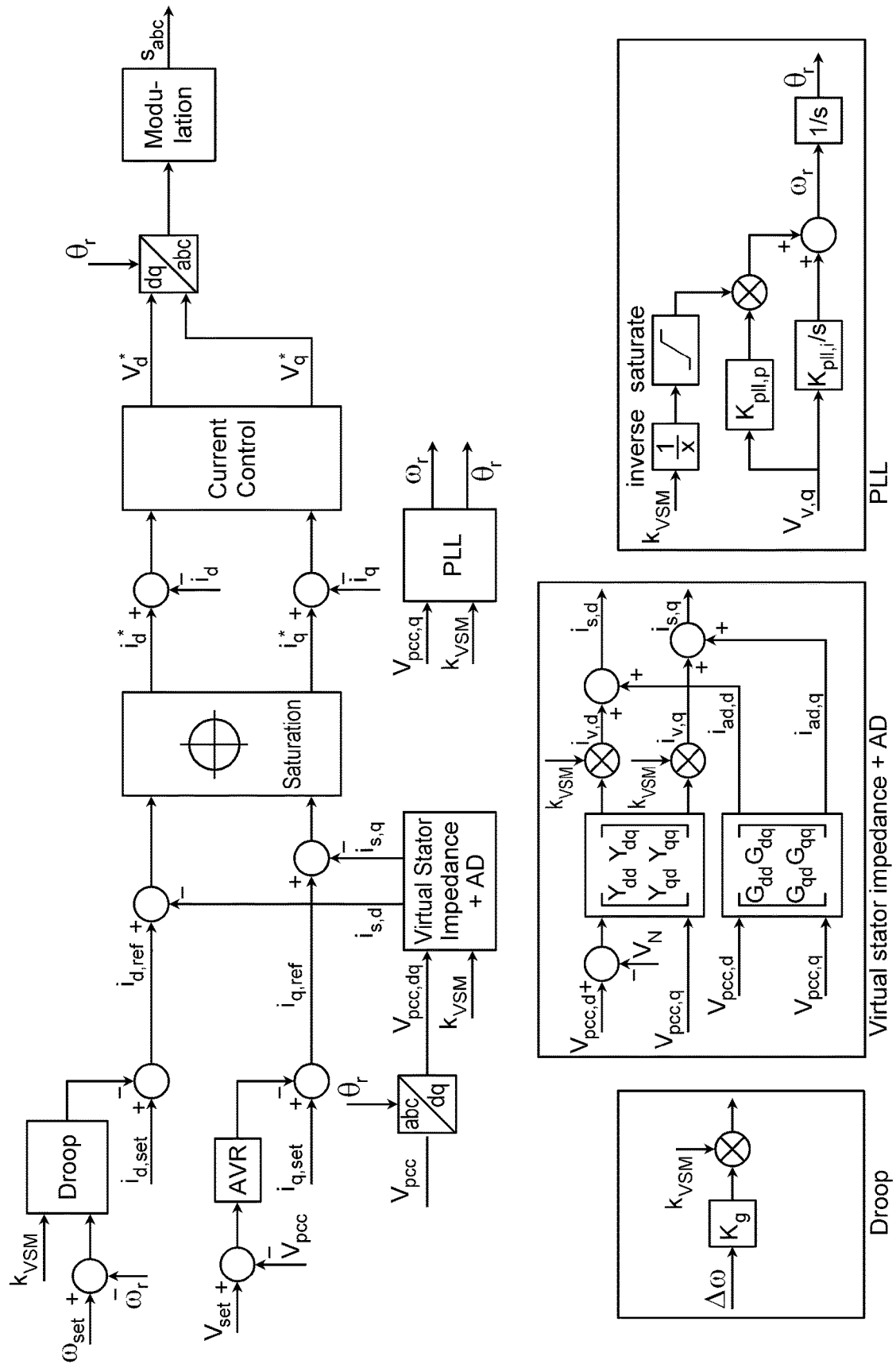
FIG. 14 shows an implementation of an active damper branch according to FIG. 13.

FIG. 13 depicts an equivalent circuit of the control concept using an active damper in parallel to the current source. FIG. 14 is a detailed view of the implementation of an active damper branch.

Optionally, two PLL blocks could be implemented. The current controller could run in a reference frame created with a fast PLL for improved performance whereas the response of the VSM is emulated with a slow PLL. Instead of a dq-frame based approach with PI current control blocks, the concept can also be implemented using any other current control method, such as current control based on proportional-resonant (PR) control, state-feedback control, LQR or MPC.

The implementation of the control method is not restricted to the synchronous dq-reference frame, but it can be implemented in any other reference frame, such as the stationary alpha-beta reference frame, or the phase oriented abc reference frame, or any other suitable reference frame. The proposed control method according to the embodiments described above is not restricted to three-phase systems. It can be implemented also for single-phase systems.

In case of an operation on the asymmetric conditions, the following measures may be taken to adapt the system thereto.

A positive/negative/zero sequence separator block can be used to extract and separate positive/negative/zero sequence components of the PCC voltage and of the converter current and use specific control schemes for the individual sequences. An improved negative sequence current control can be achieved with proportional resonant (PR) blocks tuned at the second harmonic frequency in the dq-reference frame.

Zero back-emf may be emulated for the negative-sequence component current response of a VSM, having different parameters for the positive and negative sequence virtual admittance. The harmonic current control with proportional resonant (PR) blocks can be tuned to specific harmonic frequencies or their counterpart in the dq-reference frame.

According to present disclosure, the control method proposed greatly reduces complexity of a grid forming vector current control while improving the response to faults or irregularities in the system.

Figure 15:
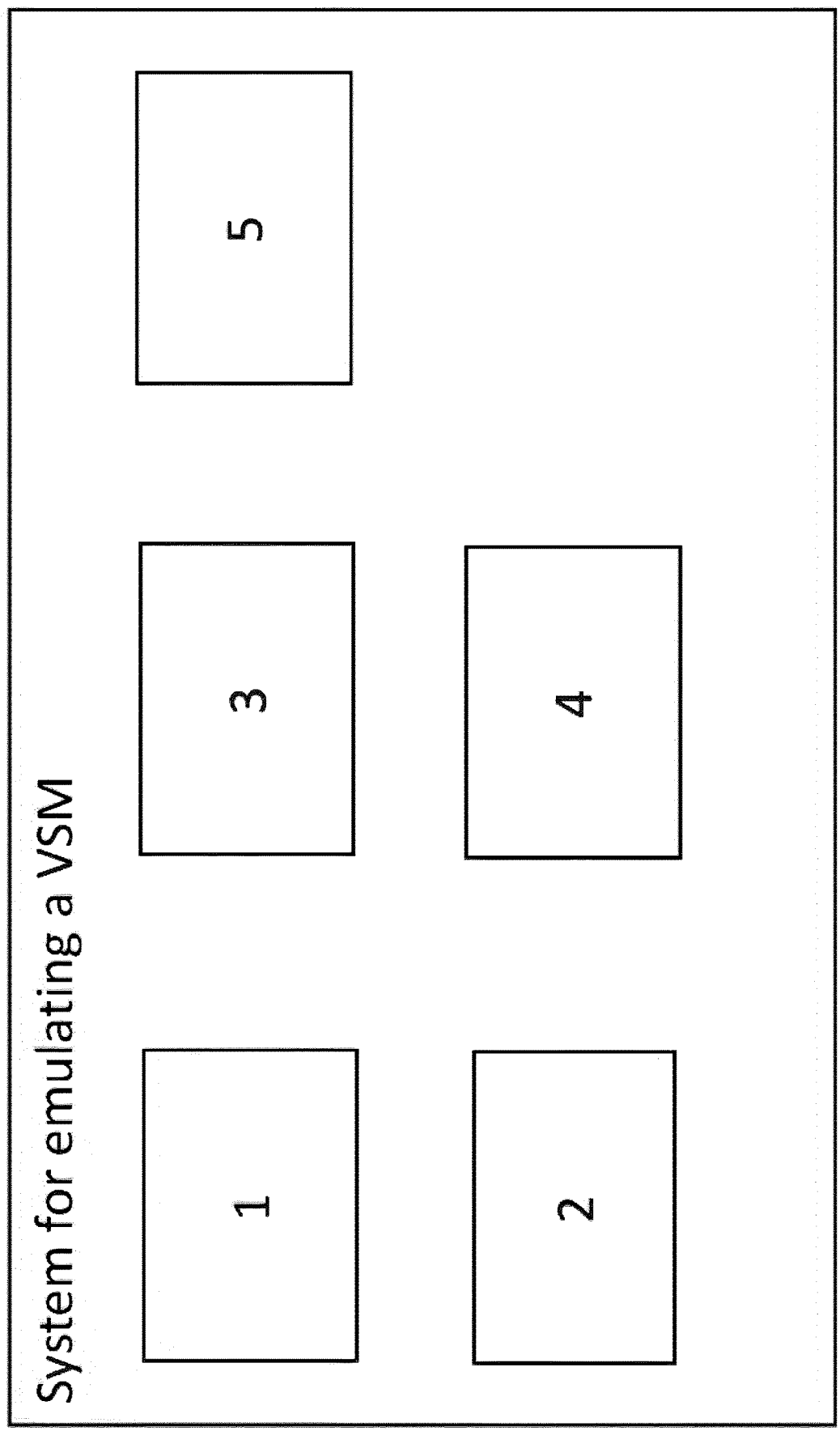
FIG. 15 shows a block diagram according to an embodiment of the present disclosure.

FIG. 15 is a schematic diagram of a grid forming vector current control system according to the present disclosure. The system is configured to emulate a virtual synchronous machine (VSM) by a droop control unit 1, a current control unit 2, a phase lock loop (PLL) unit 4 and a virtual current source 5.

Other aspects, features, and advantages will be apparent from the summary above, as well as from the description that follows, including the figures and the claims.

While embodiments have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present disclosure covers further embodiments with any combination of features from different embodiments described above and below.

Furthermore, in the claims the word "comprising" does not exclude other elements or steps, and the indefinite article "a" or "an" does not exclude a plurality. A single unit may fulfil the functions of several features recited in the claims. The terms "essentially", "about", "approximately" and the like in connection with an attribute or a value particularly also define exactly the attribute or exactly the value, respectively. Any reference signs in the claims should not be construed as limiting the scope.

LIST OF CITATIONS

[1] J. Rocabert, A. Luna, F. Blaabjerg and P. Rodriguez, "Control of Power Converters in AC Microgrids," in IEEE Transactions on Power Electronics, vol. 27, no. 11, pp. 4734-4749, November 2012

[2] S. D'Arco and J. A. Suul, "Virtual synchronous machines—Classification of implementations and analysis of equivalence to droop controllers for microgrids," 2013 IEEE Grenoble Conference, Grenoble, 2013, pp. 1-7

[3] Y. Sun, X. Hou, J. Yang, H. Han, M. Su and J. M. Guerrero, "New Perspectives on Droop Control in AC Microgrid," in IEEE Transactions on Industrial Electronics, vol. 64, no. 7, pp. 5741-5745, July 2017

The invention claimed is:

1. A grid forming vector current control system configured to emulate a virtual synchronous machine (VSM), the system comprising:
a droop control unit;
a current control unit;
a virtual admittance unit; and
a phase locked loop (PLL) unit,
wherein the virtual admittance unit and the PLL unit are configured to emulate an inertia of the VSM,
wherein a virtual current source is connected in parallel to the VSM, and
wherein a factor $k_{VSM}$ is configured to change one or more characteristics of the system continuously from voltage source to current source by proportionally scaling output signals of the virtual admittance unit with the factor $k_{VSM}$.

2. The system according to claim 1, wherein an output signal of the droop control unit is connected to the virtual current source.

3. The system according to claim 1, wherein an output signal of the droop control unit is connected to the PLL unit.

4. The system according to claim 1, further comprising an active voltage regulator (AVR) unit.

5. The system according to claim 1, wherein the system is deployed in at least one of a micro grid converter, a photovoltaic (PV) inverter, an uninterruptable power supply (UPS), a grid intertie converter, a railway grid intertie converter, a high voltage direct current (HVDC) converter, or a battery energy storage system (BESS).

6. The system according to claim 1, wherein the factor $k_{VSM}$ is fed into at least one of the droop control unit, the virtual admittance unit, or the PLL unit in order to increase or decrease an inertial response of the system to disturbances in a main grid.

7. The system according to claim 6, wherein the system is deployed in at least one of a micro grid converter, a photovoltaic (PV) inverter, an uninterruptable power supply (UPS), a grid intertie converter, a railway grid intertie converter, a high voltage direct current (HVDC) converter, or a battery energy storage system (BESS), and wherein the at least one of the micro grid converter, the PV inverter, the UPS, the grid intertie converter, the railway grid intertie converter, the HVDC converter, or the BESS is connected to the main grid.

8. The system according to claim 6, wherein the system is deployed in at least one of a micro grid converter, a photovoltaic (PV) inverter, or an uninterruptable power supply (UPS), and wherein the at least one of the micro grid converter, the PV inverter, or the UPS is connected to the main grid.

9. The system according to claim 1, wherein the factor $k_{VSM}$ scales a nominal power of the VSM by proportionally scaling the output signals of the virtual admittance unit with the factor $k_{VSM}$, inversely proportionally scaling a proportional gain of the PLL unit with the factor $k_{VSM}$, and/or proportionally scaling a droop constant with the factor $k_{VSM}$.

10. The system according to claim 1, wherein the factor $k_{VSM}$ scales at least one of a spinning wheel factor or a transient power or the inertia.

11. The system according to claim 1, wherein the droop control unit comprises a fast current source.

12. The system according to claim 4, wherein the AVR unit is configured to keep a magnitude of a voltage, at a Point of Common Coupling (PCC), constant.

13. The system according to claim 1, wherein the PLL unit is configured to measure a voltage at a Point of Common Coupling (PCC).

14. A method for controlling a grid forming vector current control emulating a Virtual Synchronous Machine (VSM), the method comprising:
providing a droop control unit,
providing a current control unit,
providing a virtual admittance unit, and
providing a phase locked loop (PLL) unit,
emulating an inertia of the VSM, and
controlling a virtual current source connected in parallel to the VSM,
wherein a factor $k_{VSM}$ changes one or more characteristics of a system, comprising the droop control unit, current control unit, virtual admittance unit, and PLL unit, continuously from voltage source to current source by proportionally scaling output signals of the virtual admittance unit with the factor $k_{VSM}$.

15. The method according to claim 14, wherein an output signal of the droop control unit is connected to the virtual current source.

16. The method according to claim 14, wherein an output signal of the droop control unit is connected to the PLL unit.

17. The method according to claim 14, further comprising feeding the factor $k_{VSM}$ into at least one of the droop control unit, the virtual admittance unit, or the PLL unit in order to increase or decrease an inertial response of the system to disturbances in a main grid.

18. A method for controlling a grid forming vector current control emulating a Virtual Synchronous Machine (VSM), the method comprising:
providing a droop control unit,
providing a current control unit,
providing a virtual admittance unit, and
providing a phase locked loop (PLL) unit,
emulating an inertia of the VSM,
controlling a virtual current source connected in parallel to the VSM, and
scaling a nominal power of the VSM by one or more of:
proportionally scaling output signals of the virtual admittance unit with a factor kVSM;
inversely proportionally scaling a proportional gain of the PLL unit with the factor kVSM; or
proportionally scaling a droop constant with the factor kVSM.

* * * * *